United States Patent
Ling (10) Patent No.: US 9,589,170 B2
(45) Date of Patent: Mar. 7, 2017

(54) INFORMATION DETECTION AND DISPLAY APPARATUS, AND DETECTING METHOD AND DISPLAYING METHOD THEREOF

(71) Applicant: Shanghai Oxi Technology Co., Ltd, Shanghai (CN)

(72) Inventor: Yan Ling, Shanghai (CN)

(73) Assignee: SHANGHAI OXI TECHNOLOGY CO LTD, Shanghai (CN)

( * ) Notice: Subject to any disclaimer, the term of this patent is extended or adjusted under 35 U.S.C. 154(b) by 0 days.

(21) Appl. No.: 14/680,237

(22) Filed: Apr. 7, 2015

(65) Prior Publication Data

US 2016/0092717 A1     Mar. 31, 2016

(30) Foreign Application Priority Data

Sep. 29, 2014    (CN) .......................... 2014 1 0514063

(51) Int. Cl.
    *G06K 9/00*          (2006.01)

(52) U.S. Cl.
    CPC ....... *G06K 9/0004* (2013.01); *G06K 9/00026* (2013.01)

(58) Field of Classification Search
    CPC ... G06K 9/00026; G06K 9/0004; G06K 9/001
    USPC ......... 382/103, 124–125; 340/5.53; 345/173, 345/175; 713/186; 902/3
    See application file for complete search history.

(56) References Cited

U.S. PATENT DOCUMENTS

| | | | |
|---|---|---|---|
| 5,446,290 A | 8/1995 | Fujieda et al. | |
| 5,991,467 A | 11/1999 | Kamiko | |
| 8,605,960 B2 * | 12/2013 | Orsley | G06F 3/0421 382/124 |
| 2004/0252867 A1 | 12/2004 | Lan et al. | |
| 2008/0303786 A1 * | 12/2008 | Nakamura | G06F 3/0412 345/156 |
| 2013/0194236 A1 * | 8/2013 | Gu | A61B 1/00172 345/175 |
| 2014/0168167 A1 * | 6/2014 | Chou | G06K 9/00026 345/175 |
| 2015/0186092 A1 * | 7/2015 | Francis | G06F 3/1423 345/520 |

FOREIGN PATENT DOCUMENTS

| | | |
|---|---|---|
| JP | 06325158 A | 11/1994 |
| WO | WO-2007-145346 A1 | 12/2007 |

* cited by examiner

*Primary Examiner* — Daniel Mariam
(74) *Attorney, Agent, or Firm* — Swanson & Bratschun, L.L.C.

(57) ABSTRACT

An information detection and display apparatus, and detecting method and displaying method thereof are provided. The information detection and display apparatus includes: an optical sensor; a protective layer disposed on the optical sensor; and a display screen disposed underneath the optical sensor, wherein the display screen serves as a light source when the optical sensor is used for detecting optical information. The information detection and display apparatus can be used for generating optical fingerprint image, detecting finger touching, and displaying information. Thus, the information detection and display apparatus has multiple functions and applications.

21 Claims, 6 Drawing Sheets

INFORMATION DETECTION AND DISPLAY APPARATUS, AND DETECTING METHOD AND DISPLAYING METHOD THEREOF

CROSS-REFERENCE TO RELATED APPLICATIONS

The present application claims priority to Chinese patent application No. 201410514063.9, filed on Sep. 29, 2014, and entitled "INFORMATION DETECTION AND DISPLAY APPARATUS, AND DETECTING METHOD AND DISPLAYING METHOD THEREOF", the entire disclosure of which is incorporated herein by reference.

TECHNICAL FIELD

The present disclosure generally relates to the field of optoelectronic technology, and more particularly, to an information detection and display apparatus, and methods for detecting and displaying information.

BACKGROUND

Fingerprint recognition technology can be used for personal identification or verification. Specifically, in a fingerprint recognition system, fingerprint images are captured by a fingerprint sensor. Thereafter, a matching process between the fingerprint images captured and templates stored in the system is performed, so as to determine if they are matching or not. Since the fingerprint recognition technology is kindly to user and fingerprint is distinctive, the fingerprint recognition technology is widely used in various applications, such as personal identification in policeman stations, physical access control in buildings, device access control in personal computers or mobile phones, and so on.

The first step of fingerprint recognition is fingerprint image capturing, which can be achieved by many type of fingerprint imaging systems such as optical fingerprint imaging system, capacitive fingerprint imaging system, ultrasonic fingerprint imaging system and the like. Among the above, the optical fingerprint imaging system has better performance and lower cost.

Figure 1:
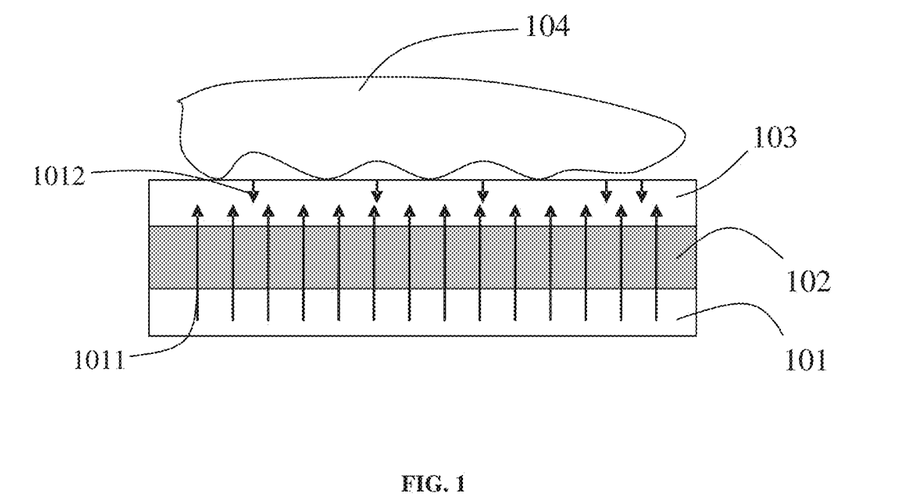
FIG. 1 schematically illustrates an optical fingerprint imaging system according to prior art.

An optical fingerprint imaging system can implement the fingerprint image capturing based on light transmission and reflection at an interface between optical mediums. Referring to FIG. 1, an existing optical fingerprint imaging system is illustrated, which basically includes a backlight board 101, an optical fingerprint sensor 102, and a piece of protective glass 103. During a fingerprint image capturing process, a human finger 104 touches the protective glass 103 for a while. Light 1011 (indicated by long arrows pointing up in FIG. 1) emitted from the backlight board 101 penetrates through the optical fingerprint sensor 102 and the protective glass 103, and then reaches the interface between the finger 104 and the protective glass 103. At the interface, part of the light 1011 is reflected while the other part passes through. Thereafter, reflected light 1012 (indicated by short arrows pointing down in FIG. 1) penetrates through the protective glass 103 again and reaches the optical fingerprint sensor 102. In the optical fingerprint sensor 102, the reflected light 1012 is converted into electrical signals, such that a fingerprint image can be established. The image is obtained by processing the electronic signals which is proportional to strength of the reflected light 1012. Since the light 1012 is reflected by the interface between the finger 104 and the protective glass 103, it can be conceived that the strength of the reflected light 1012 can represent features of the interface. Further, the features of the interface depend on the features of the fingerprint. In light of the above, the image can directly present the features of the fingerprint.

However, existing fingerprint imaging systems are only used for capturing fingerprint images, which means they have limited usages.

SUMMARY

The present disclosure is trying to provide an information detection and display apparatus, and detecting method and displaying method thereof. The information detection and display apparatus provided not only can be used for optical fingerprint imaging, but also can be used for displaying. Further, the information detection and display apparatus can be used for detecting a touching position of a finger as well. Therefore, the information detection and display apparatus provided by the present disclosure has multiple functions and applications.

According to one embodiment of the present disclosure, an information detection and display apparatus is provided. The apparatus includes an optical sensor and a protective layer disposed above the optical sensor. The apparatus further includes a display screen disposed underneath the optical sensor. The display screen serves as a light source when the optical sensor is used for detecting optical information.

Optionally, the optical sensor includes a transparent substrate, and an optical fingerprint imaging array disposed on the transparent substrate.

Optionally, the optical fingerprint imaging array includes a plurality of optical fingerprint imaging pixels each of which has a transparent region and an opaque region.

Optionally, the optical fingerprint imaging array is formed by an amorphous silicon process, an oxide semiconductor process, or a low temperature poly-silicon process.

Optionally, the display screen has ability to display at least one type of white light, purple light, blue light, cyan light, green light, yellow light, orange light, red light, or near-infrared light.

Optionally, in each of the optical fingerprint imaging pixels, a ratio of an area of the transparent region to that of the whole optical fingerprint imaging pixel ranges from 5% to 50%.

Optionally, each of the optical fingerprint imaging pixels has a length less than or equal to 200 micrometers, and a width less than or equal to 200 micrometers.

Optionally, display pixels of the display screen are grouped into a plurality of display units each of which has a length not less than that of the optical fingerprint imaging pixel, and a width not less than that of the optical fingerprint imaging pixel.

Optionally, each of the display units includes a plurality of display pixels, where the plurality of display pixels in a same display unit display a same color.

Optionally, the display pixels in each display unit may further include black and white sub-pixels; red, green and blue sub-pixels; red, green, blue and yellow sub-pixels, or red, green, blue and white sub-pixels.

Optionally, the display screen is a liquid crystal display screen, an organic light emitting diode display screen, or an inorganic light emitting diode display screen; and the protective layer includes fiber optic plate, glass, sapphire or plastic.

According to one embodiment of the present disclosure, a method for detecting an optical fingerprint image using the information detection and display apparatus as recited above is provided, including:

emitting, by the display screen, a first beam of light;

receiving, by the optical sensor, a second beam of light, where the second beam of light is generated by: the first beam of light penetrating through the optical sensor and the protective layer to irradiate at a finger attached on the protective layer, part of the first beam of light being reflected by epidermal and dermal ridges of the finger and thereby becoming the second beam of light, and the second beam of light transmitting to the optical sensor; and generating a first image based on the second beam of light. The first image may represent pattern of the epidermal or the dermal ridges of the finger.

Optionally, the first beam of light includes at least one type of white light, purple light, blue light, cyan light, green light, yellow light or orange light.

Optionally, the method further includes:

emitting, by the display, a third beam of light;

receiving, by the optical sensor, a fourth beam of light, where the fourth beam of light is generated by: the third beam of light penetrating through the optical sensor and the protective layer to irradiate at the finger attached on the protective layer, part of the third beam of light being reflected by dermis or veins of the finger and thereby becoming the fourth beam of light, and the fourth beam of light transmitting to the optical sensor; and generating a second image based on the fourth beam of light. The second image may represent the dermis or the veins of the finger.

Optionally, the method further includes processing the second image based on the first image, so as to generate a third image. The third image may represent the dermis or the veins of the finger without influence pattern of the epidermal or the dermal ridges. In some embodiments, processing the second image based on the first image includes implementing image subtraction between the first image and the second image. Differences between image pixels of the first image and the second image can be calculated, such that image features representing a pattern of the epidermal or the dermal ridges contained in the second image may be removed.

According to one embodiment of the present disclosure, a detecting method of any one of the information detection and display apparatus recited above is provided, including:

emitting, by the display screen, a first beam of light;

receiving, by the optical sensor, a second beam of light, wherein the second beam of light is generated by: the first beam of light penetrating through the optical sensor and the protective layer to irradiate at a finger attached on the protective layer, part of the first beam of light being reflected by the finger and thereby becoming the second beam of light, and the second beam of light transmitting to the optical sensor;

generating a fingerprint image of the finger based on the second beam of light; and calculating a finger touching position based on a position of the fingerprint image.

According to one embodiment of the present disclosure, a displaying method of any one of the information detection and display apparatus recited above is provided, including:

the display screen emitting light to display an image, where the light penetrates through the transparent regions of the optical sensor and the protective layer.

According to one embodiment of the present disclosure, a displaying method of any one of the information detection and display apparatus recited above is provided, including:

the display screen displaying an image;

the optical sensor generating a fingerprint image of a finger; and the display screen updating the image based on a position at which the finger touches the apparatus, where the position is detected based on the fingerprint image.

According to one embodiment of the present disclosure, an information detection and display apparatus is provided, including an optical sensor, a protective layer disposed on the optical sensor, and a display screen disposed underneath the optical sensor. The display screen also serves as a light source when the optical sensor is used for detecting optical information. The optical sensor includes a transparent substrate, and an optical fingerprint imaging array disposed on the transparent substrate. A finger-touch detecting array is disposed on the optical fingerprint imaging array. The finger-touch detecting array includes a plurality of finger touch sensing pixels arranged in an array.

Optionally, the finger-touch detecting pixel is larger than or equal to the optical fingerprint imaging pixel, and each of the finger-touch detecting pixels includes an electrode pad which forms a coupling capacitor with skin of the finger attached on the protective layer.

Optionally, the electrode pad of the finger-touch detecting pixel is made of transparent conductive material.

According to one embodiment of the present disclosure, a method for detecting a touching position of a finger attached on the protective layer using the information detection and display apparatus recited above is provided, including:

reading signals from the finger-touch detecting pixels, wherein the signals are generated by a coupling capacitor formed by the finger-touch detecting pixels and the finger; and implementing a calculation based on the signals to generate a touching position of the finger.

According to one embodiment of the present disclosure, a displaying method of any one of the information detection and display apparatus recited above is provided, including:

the display screen displaying an image;

the finger-touch detecting array detecting a touching position of a finger; and the display screen updating the image based on the touching position of the finger.

According to technique solutions of the present disclosure, the information detection and display apparatus provided includes: an optical sensor; a protective layer disposed on the optical sensor; and a display screen disposed underneath the optical sensor, wherein the display screen serves as a light source when the optical sensor is used for detecting optical information. Accordingly, when the information detection and display apparatus is used for capturing fingerprint images, the display screen which displays a pure color image or any other image can serve as a light source. When the information detection and display apparatus is used for displaying, the display screen can play a role of displaying information, as light provided by the display screen can pass through the optical sensor and seen by a user. Accordingly, in comparison with conventional optical fingerprint imaging systems, the information detection and display apparatus provided by the present disclosure not only can be used for capturing a fingerprint image, but also can be used as a display screen. Thus, the information detection and display apparatus has more functions. Furthermore, when the information detection and display apparatus is used for capturing a fingerprint image, the display screen can be used for displaying corresponding information to inform the user, or displaying instructions for the user to implement certain operations. Therefore, the information detection and display apparatus has more applications.

Further, the optical fingerprint imaging array includes a plurality of optical fingerprint imaging pixels arranged in an array, and each of the optical fingerprint imaging pixels has a transparent region and an opaque region. In each of the optical fingerprint imaging pixels, a ratio of the area of the transparent region to that of the optical fingerprint imaging pixel ranges from 5% to 50%, thus the information detection and display apparatus can play a well role of displaying and capturing an image. Specifically, if the ratio is smaller than 5%, displaying performance of the information detection and display apparatus may be dramatically degraded. That is because, in this case, the area of the opaque region is too large, thus light from the display screen penetrated through the sensor is not enough. If the ratio is larger than 50%, an area of the photosensitive device in the optical sensor will shrink too much. In this case, the sensor's sensitivity is too small.

Further, the finger-touch detecting array includes a plurality of finger-touch detecting pixels arranged in an array, and each of the finger-touch detecting pixels includes an electrode pad. The electrode pad and skin of the finger attached on the protective layer can constitute a coupling capacitor, thus coupling signals can be generated. Since coupling signals from touching detecting pixels where the finger touched is significantly different from coupling signals from other touching detecting pixels, the finger touching position can be calculated based on the differences between the coupling signals.

DETAILED DESCRIPTION

In order to clarify the objects, characteristics and advantages of the present disclosure, embodiments of the present disclosure will be described in detail in conjunction with the accompanying drawings. The disclosure will be described with reference to certain embodiments. Accordingly, the present disclosure is not limited to the embodiments disclosed. It will be understood by those skilled in the art that various changes may be made without departing from the spirit or scope of the disclosure.

As described in the background, the existing optical fingerprint imaging systems are only used for capturing fingerprint images, which means they only have limited usages.

In order to solve problems mentioned above, an information detection and display apparatus is provided by the present disclosure, including: an optical sensor; a protective layer disposed over the sensor; and a display screen disposed underneath the sensor, wherein the display screen serves as a light source when the sensor is used for detecting optical information. Accordingly, when the information detection and display apparatus is used for capturing fingerprint images, the display screen which displays a pure color image or any other image can serve as a light source. When the information detection and display apparatus is used for displaying, the display screen can play a role of displaying information, as image information provided by the display screen can pass through the sensor and seen by a user. Accordingly, in comparison with conventional optical fingerprint imaging systems, the information detection and display apparatus provided by the present disclosure not only can be used for capturing fingerprint images, but also can be used for displaying. Thus, the information detection and display apparatus has more functions. Furthermore, when the information detection and display apparatus is capturing fingerprint images, the display screen can be used for displaying corresponding information to inform the user, or displaying instructions to remind the user to implement certain operations. Therefore, the information detection and display apparatus has more applications.

Figure 2:
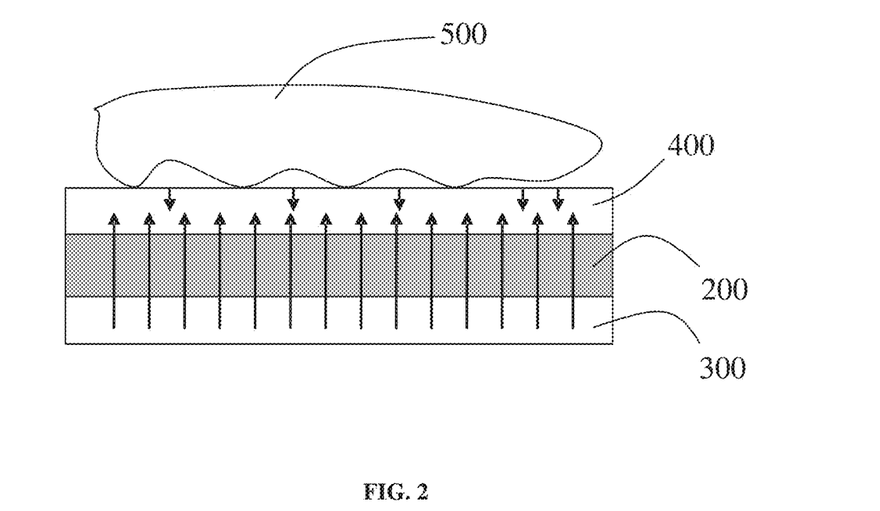
FIG. 2 schematically illustrates an information detection and display apparatus according to one embodiment of the present disclosure.

Referring to FIG. 2, an information detection and display apparatus according to one embodiment of the present disclosure is illustrated. The information detection and display apparatus includes an optical sensor 200 and a protective layer 400 disposed on the sensor 200. A finger 500 placed on a surface of the protective layer 400 is also shown in FIG. 2. The information detection and display apparatus further includes a display screen 300 which is disposed underneath the sensor 200. When the sensor 200 implementing an optical fingerprint imaging process, the display screen 300 can display a pure color image or any other image, wherein the pure color image or the any other image serves as a light source. The pure color image may be a blue color image, a green color image, a white color image, a yellow color image, a purple color image or an orange color image. The any other image may be any combination of the above mentioned pure color images.

It should be noted that, in the present disclosure, if a first layer is disposed over/on a second layer, it means the first layer is near to eyes of a user while the second layer is far from the eyes of the user, when the information detection and display apparatus is in normal use. Correspondingly, if a first layer is disposed underneath a second layer, it means the first layer is far from eyes of a user while the second layer is near to the eyes of the user.

In some embodiments, the display screen 300 can display at least one type of white light, purple light, blue light, cyan light, green light, yellow light or orange light. In some embodiments, the display screen 300 can display at least one of red light or near-infrared light (human eye is not sensitive to near-infrared light).

In some embodiments, the protective layer 400 has an upper surface. The finger 500 can be pressed on the upper surface, thus fingerprints of the finger 500 can be captured by the sensor 200. The protective layer 400 may be made of fiber optic plate (FOP), glass, sapphire or plastic.

Figure 3:
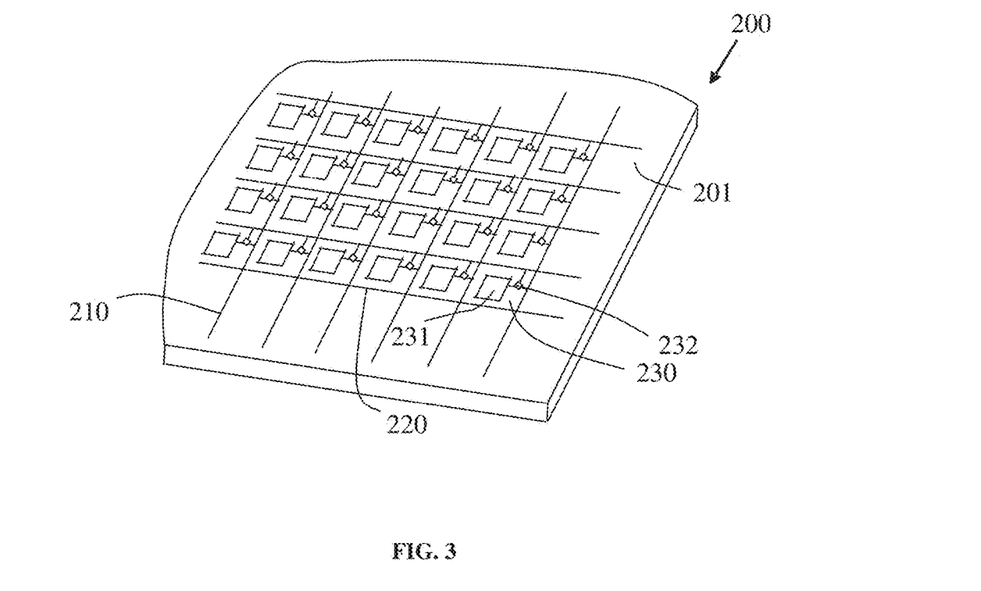
FIG. 3 schematically illustrates an optical sensor of the information detection and display apparatus as shown in FIG. 2.

Referring to FIG. 3, a specific structure of the sensor 200 is illustrated. In the information detection and display apparatus, the sensor 200 includes a transparent substrate 201 and an optical fingerprint imaging array (not shown in FIG. 3) disposed on the transparent substrate. The optical fingerprint imaging array includes a plurality of optical fingerprint imaging pixels (not shown in FIG. 3) arranged in an array, and each of the optical fingerprint imaging pixels has a transparent region 230 and an opaque region (not shown in FIG. 3). The opaque regions of the optical fingerprint imaging pixels also belong to an opaque portion of the entire optical fingerprint sensor.

In some embodiments, the optical fingerprint imaging array may be formed by an amorphous silicon (A-Si) process, an oxide semiconductor process, or a low temperature poly silicon (LTPS) process.

In some embodiments, the transparent substrate 201 may be made of glass, sapphire or plastic.

Referring still to FIG. 3, the optical fingerprint imaging array further includes signal lines 210 and drive lines 220. Usually, the signal lines 210 and the drive lines 220 are arranged along different axial directions. Thus, the signal lines 210 and the drive lines 220 can intercross with each other to define a number of regions, wherein the optical fingerprint imaging pixels can be disposed on the regions, respectively. Each of the regions where the optical fingerprint imaging pixels disposed includes a signal control switch device 232 and a photosensitive device 231. Usually, both the signal control switch device 232 and the photosensitive device 231 are opaque. Accordingly, in the optical fingerprint imaging array, the signal lines 210, the drive lines 220, the signal control switch device 232 and the photosensitive device 231 are opaque, other parts are transparent. In other words, in the region where one single optical fingerprint imaging pixel disposed, the signal control switch device 232 and the photosensitive device 231 are disposed on the predetermined opaque region, other parts are disposed on the predetermined transparent region 230. Therefore, the optical array sensor is partially transparent.

In some embodiments, in each of the optical fingerprint imaging pixels, a ratio of the area of the transparent region 230 to that of the whole optical fingerprint imaging pixel ranges from 5% to 50%. If the ratio is smaller than 5%, the displaying performance of the information detection and display apparatus may be dramatically degraded. Specifically, in this case, an area of the opaque region is too large, thus light from the display screen 300 penetrated through the sensor 200 is not enough. If the ratio is larger than 50%, an area of the photosensitive device 231 in the sensor 200 will shrink too much. In this case, the sensor's sensitivity is too small.

The displaying performance of the display screen 300 of the information detection and display apparatus can be improved by raising a filling percentage of the transparent region 230 with respect to the total area of the optical fingerprint imaging pixel. Specifically, the filling percentage of the transparent region 230 with respect to the total area of the optical fingerprint imaging pixel can be set to 30%, 35%, 41%, 42%, 43%, 44%, 45%, 46%, 47%, 48%, 49% or 50%.

In some embodiments, the optical fingerprint imaging pixel may have a length less than or equal to 200 micrometers and a width less than or equal to 200 micrometers. The optical fingerprint imaging pixel is designed to have a smaller size, so as to improve a sensing resolution of the optical fingerprint sensor.

Figure 4:
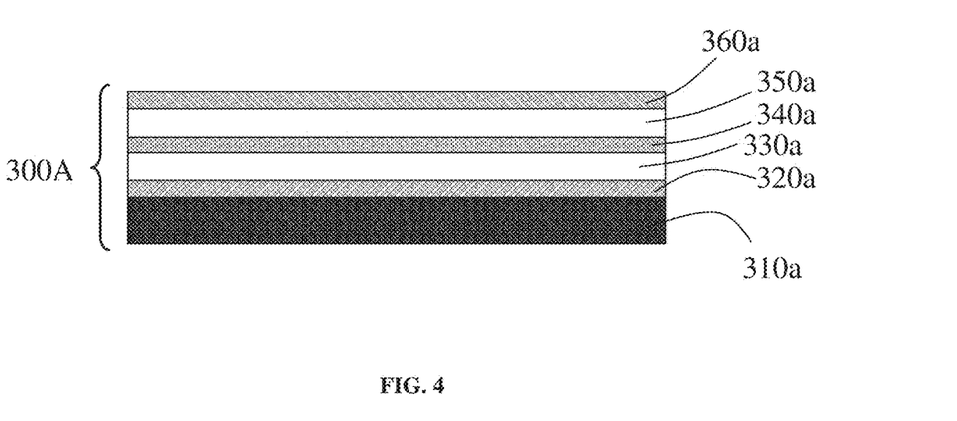
FIG. 4 schematically illustrates a first display screen of the information detection and display apparatus as shown in FIG. 2.
Figure 5:
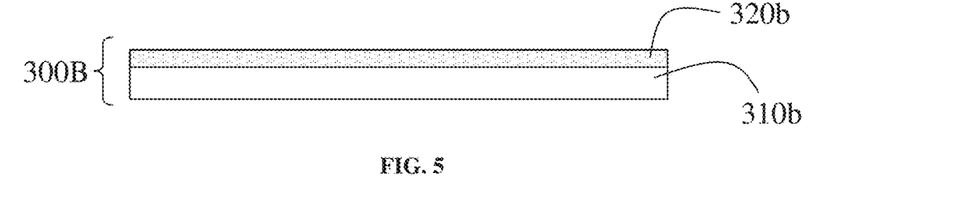
FIG. 5 schematically illustrates a second display screen of the information detection and display apparatus as shown in FIG. 2.
Figure 6:
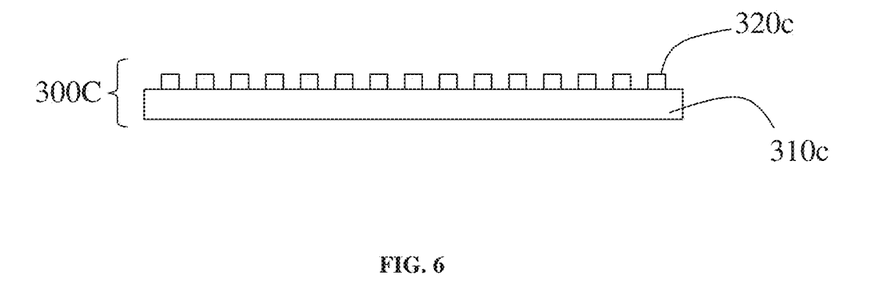
FIG. 6 schematically illustrates a third display screen of the information detection and display apparatus as shown in FIG. 2.

Referring to FIG. 4 to FIG. 6, three different configurations of the display screen 300 as shown in FIG. 2.

Specifically, as shown in FIG. 4, in the first configuration, the display screen 300 is a liquid crystal display (LCD) screen 300A. The LCD screen 300A includes a backlight (not shown in FIG. 4), a backlight board 310a, a lower polarizer 320a, a lower substrate 330a, a liquid crystal layer 340a, an upper substrate 350a and an upper polarizer 360a. The lower substrate 330a includes a pixel array (not shown in FIG. 4) and a lower electrode layer (not shown in FIG. 4), wherein the lower electrode layer is used for applying a first bias voltage to the liquid crystal layer 340a. The upper substrate 350a includes a common electrode layer (not shown in FIG. 4) which is used for applying a second bias voltage to the liquid crystal layer 340a. The upper substrate 350a may further include a color filter (CF). However, in some embodiments, the upper substrate 350a may not include the CF.

It should be noted that, when the upper substrate 350a does not include a CF, in the LCD screen 300A, the backlight may include two types of light: white light, and near-infrared light. Through the near-infrared light, the display 300A can display the near-infrared light.

As shown in FIG. 5, in the second configuration, the display screen 300 is an organic light-emitting diode (OLED) display screen 300B. The OLED display screen 300B includes a substrate 310b and an OLED layer 320b. The OLED layer 320b includes a common electrode (not shown in FIG. 5) and a CF (not shown in FIG. 5) disposed at a top portion thereof. Similarly, in some embodiments, the OLED layer 320b may not include the CF.

As shown in FIG. 6, in the third configuration, the display 300 is an (inorganic) light-emitting diode (LED) display screen 300C. The LED display screen 300C includes a printed circuit board (PCB) 310c and a LED array 320c. The PCB 310c in the LED display 300C may be replaced by a flexible printed circuit (FPC) which is thinner.

In some embodiments, a minimum display block of the display screen 300 is a display pixel, regardless which one of the above three configurations the display screen 300 has. However, in this embodiment, the minimum display block of the display screen 300 is a display unit, wherein the display unit includes at least one display pixel. Furthermore, the display pixels in the same display unit are used for displaying a same color. In some embodiments, each of the display units may include a plurality of display pixels, where the display pixels in a same display unit display a same color. In some embodiments, the display pixels may include black and white sub-pixels; red, green and blue sub-pixels; red, green, blue and yellow sub-pixels, or red, green, blue and white sub-pixels.

As the display pixels in the same display unit are used for displaying the same color, the display screen can take the display unit instead of the display pixel as the minimum display block. However, of course, when the display unit includes only one display pixel, the minimum display block is not only the display unit but also the display pixel.

In some embodiments, in order to make sure that the display screen which is disposed underneath the sensor can clearly display corresponding image information, the display unit is designed to have a length larger than or equal to a length of one pixel of the optical fingerprint imaging array, and have a width larger than or equal to a width of one pixel of the optical fingerprint imaging array. Under this circumstance, a display resolution of the display screen is less than or equal to a resolution of the optical fingerprint imaging array. Thus, the minimum display block is larger than or equal to one pixel of the optical fingerprint imaging array. By such way, the image information is not tend to be affected by blocking of the opaque region of the pixel of the optical fingerprint imaging array, even though the resolution of the image information may be low.

Figure 7:
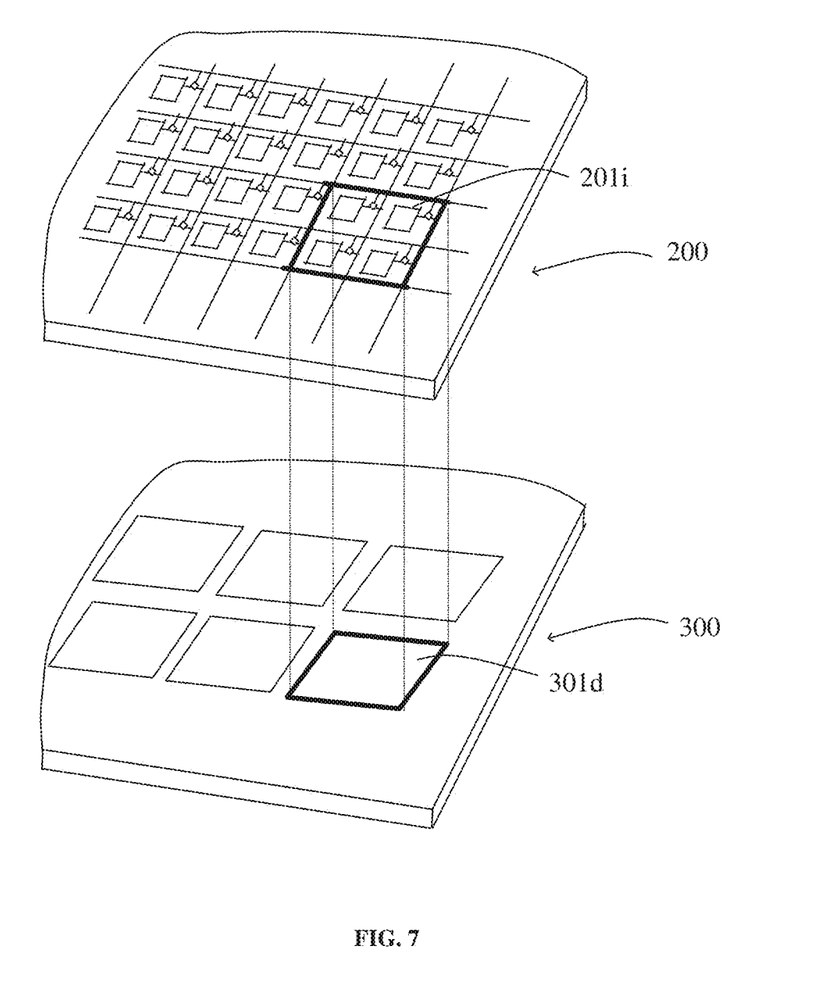
FIG. 7 schematically illustrates a first corresponding alignment between display pixels and optical fingerprint imaging pixels of the information detection and display apparatus as shown in FIG. 2.
Figure 8:
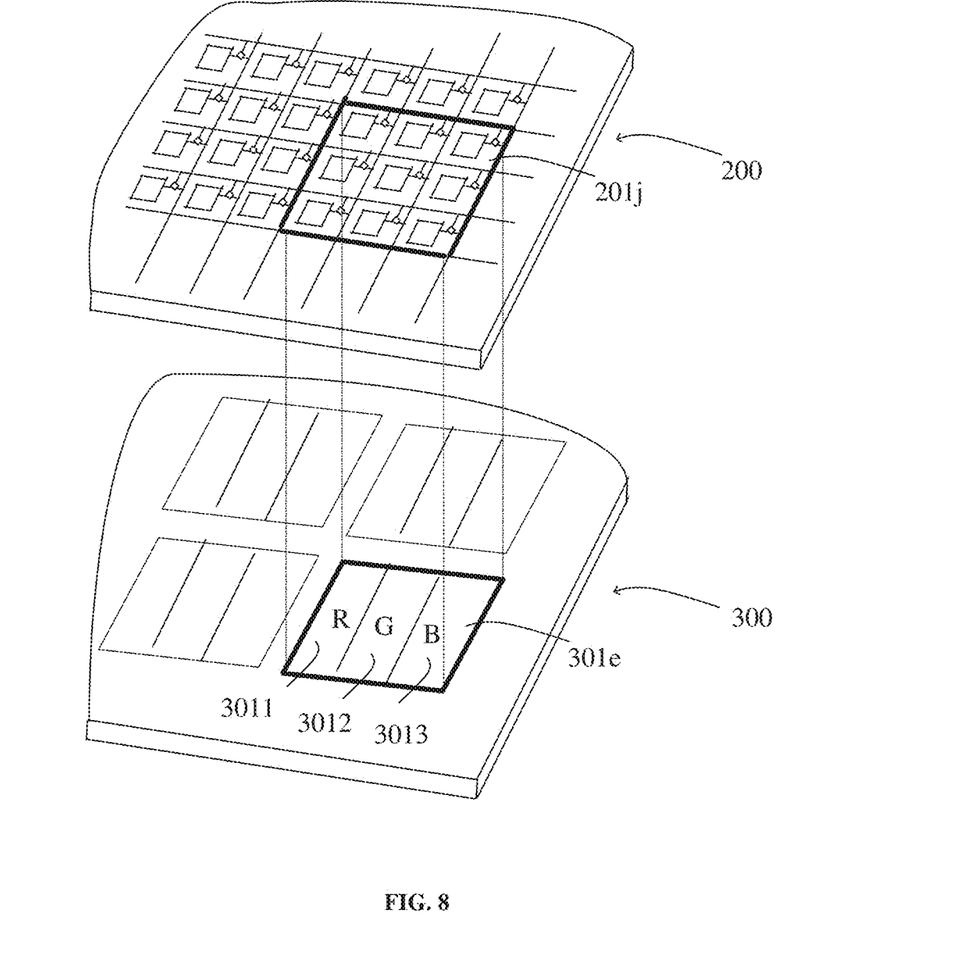
FIG. 8 schematically illustrates a second corresponding alignment between display pixels and optical fingerprint imaging pixels of the information detection and display apparatus as shown in FIG. 2.
Figure 9:
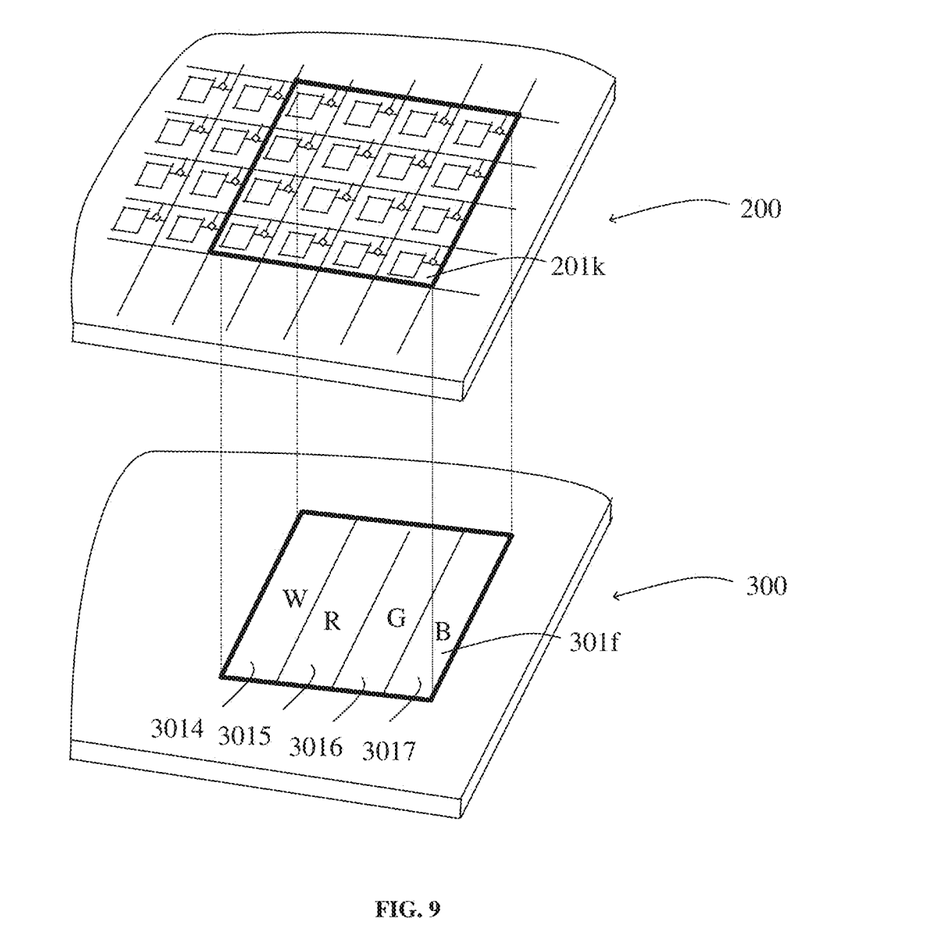
FIG. 9 schematically illustrates a third corresponding alignment between display pixels and optical fingerprint imaging pixels of the information detection and display apparatus as shown in FIG. 2.

Referring to FIG. 7 to FIG. 9, corresponding alignments between the pixels of the optical fingerprint imaging array in the sensor 200 shown in FIG. 2 and the display unit in the display 300 shown in FIG. 2 are illustrated in FIG. 7 to FIG. 9.

As shown in FIG. 7, a first corresponding alignment is illustrated. The display screen 300 includes a number of display units 301d. Each of the display units 301d may include at least one display pixel (not shown in FIG. 7), for example, the display unit may include one display pixel, two display pixels, or more than three display pixels. In FIG. 7, however, all display pixels are black and white pixels.

As shown in FIG. 7, one display unit 301d corresponds to four (2×2) pixels 201i of the optical fingerprint array, wherein the four pixels 201i are arranged in two lines and two rows. Under this circumstance, the resolution of the display 300 may be low, but the image information displayed by the display screen 300 is not tend to be affected by blocking of the opaque portion (referring to FIG. 3) of the optical fingerprint imaging array.

It should be noted that, in some other embodiments, when the display pixels are black and white pixels, one display unit can be arranged to correspond to one pixel of the optical fingerprint imaging array. That is because, when all display pixels are black and white pixels, the display screen is a black and white display screen. As the display pixels of the display screen are black and white pixels, the opaque regions in the optical fingerprint imaging array have little effect to the image information displayed by the display screen 300. Therefore, the one display unit is able to be arranged to correspond to one pixel of the optical fingerprint imaging array, so that the resolution of the display can be in a high level.

Similarly, in some other embodiments of the present disclosure, one display unit is able to be arranged to correspond to more than five pixels of the optical fingerprint imaging array, so as to increase an area of the display unit. The area of the display unit can be increased by increasing an area of the display pixel of the display unit, or by including more display pixels in the display unit. No matter which way is used for enlarging the area of the display unit, the resolution of the display will be reduced, but the image information displayed by the display will not be affected. In addition, when one display unit is arranged to correspond to more pixels of the optical fingerprint imaging array, effect to the display of the image information caused by the opaque region in pixel of the optical fingerprint imaging array will be further reduced.

As shown in FIG. 8, a second corresponding alignment is illustrated. The display screen 300 includes a number of display units (not labeled in FIG. 8). In FIG. 8, four display pixels 301e and four display units are shown. In other words, each display unit as shown in FIG. 8 includes only one display pixel 301e. Furthermore, in this case as shown in FIG. 8, the display pixel 301e includes a red sub-pixel 3011, a green sub-pixel 3012 and a blue sub-pixel 3013.

It should be noted that, in some other embodiments of the present disclosure, when the display pixel includes a red sub-pixel, a green sub-pixel and a blue sub-pixel, each display unit can be configured to include two or more display pixels.

As shown in FIG. 8, one display pixel 301e (display unit) corresponds to nine (3×3) pixels 201j of the optical fingerprint array, wherein the nine pixels 201j are arranged in three lines and three rows. Under this circumstance, the resolution of the display screen 300 may be lower, but the image information displayed by the display screen 300 is not tend to be affected by blocking of the opaque portion (referring to FIG. 3) of the optical fingerprint imaging array.

It should be noted that, in some other embodiments of the present disclosure, when the display pixel includes a red sub-pixel, a green sub-pixel and a blue sub-pixel, each display unit may be arranged to correspond to more than 3×3 pixels of the optical fingerprint array. For example, each display unit may be configured to correspond to 3×4, 4×3 or 5×3 pixels of the optical fingerprint array.

When the display pixel includes a red sub-pixel, a green sub-pixel and a blue sub-pixel, each display unit is arranged to correspond to 3×3 pixels of the optical fingerprint array, so that the display pixels and the pixels of the optical fingerprint array are able to be neatly corresponded to each other. Therefore, when the display screen displaying the image information, effect to the image information caused by the opaque region in the pixels of the optical fingerprint imaging array will be reduced, and color display will be obtained.

As shown in FIG. 9, a third corresponding alignment is illustrated. The display screen 300 includes a number of display units (not labeled in FIG. 9). In FIG. 9, one display pixel 301f and one display unit are shown. In other words, the display unit as shown in FIG. 9 includes only one display pixel 301f. Furthermore, in this case as shown in FIG. 9, the display pixel 301f includes a red sub-pixel 3015, a green sub-pixel 3016, a blue sub-pixel 3017 and a yellow sub-pixel 3014.

It should be noted that, in some other embodiments of the present disclosure, when the display pixel includes a red sub-pixel, a green sub-pixel, a blue sub-pixel and a yellow sub-display, each display unit may be configured to include two or more display pixels.

As shown in FIG. 9, one display unit corresponds to sixteen (4×4) pixels 201k of the optical fingerprint array, wherein the sixteen pixels 201k are arranged in four lines and four rows. Under this circumstance, the resolution of the display screen 300 may be lower, but effect to the image information displayed by the display screen 300 which is caused by blocking of the opaque portion of the optical fingerprint imaging array will be further reduced.

As shown in FIG. 9, the display pixel 301f includes the red sub-pixel 3015, the green sub-pixel 3016, the blue sub-pixel 3017 and a white sub-pixel 3014 (the white sub-pixel 3014 can be replaced by the yellow sub-pixel). Further, the display unit corresponds to at least 4×4 pixels 201k of the optical fingerprint array.

It should be noted that, in some other embodiments of the present disclosure, when the display pixel includes a red sub-pixel, a green sub-pixel, a blue sub-pixel and a white sub-pixel (the white sub-pixel can be replaced by the yellow sub-pixel), each display unit may be arranged to correspond to more than 4×4 pixels of the optical fingerprint array. For example, each display unit may be arranged to correspond to 8×4, 8×8 or 12×12 pixels of the optical fingerprint array.

When the display pixel includes a red sub-pixel, a green sub-pixel, a blue sub-pixel and a white sub-pixel (the white sub-pixel can be replaced by the yellow sub-pixel), each display unit is arranged to correspond to 4×4 pixels of the optical fingerprint array, so that the display pixels and the pixels of the optical fingerprint array are able to be neatly corresponded to each other. Therefore, when the display screen displaying the image information, effect to the image information caused by the opaque region in the pixel of the optical fingerprint imaging array will be reduced, and color display will be obtained.

It should be noted that, in some other embodiments of the present disclosure, if the display unit includes more than 4×4 display pixels each of which includes the red sub-pixel, the green sub-pixel, the blue sub-pixel and the yellow sub-pixel, or includes the red sub-pixel, the green sub-pixel, the blue sub-pixel and the white sub-pixel, each display unit will be arranged to correspond to at least 4×4 pixels of the optical fingerprint array. In other words, one display pixel corresponds to one pixel of the optical fingerprint array. Furthermore, the opaque region of the pixel of the optical fingerprint array corresponds to the yellow sub-pixel or the white sub-pixel.

It should be noted that, in some other embodiments of the present disclosure, the display unit corresponds to M×N pixels of the optical fingerprint array, and the display unit includes M×N display pixels, wherein M and N are positive integers. As such, one display pixel corresponds to one pixel of the of the optical fingerprint array.

In comparison with the optical fingerprint imaging system shown in FIG. 1, the information detection and display apparatus provided by the present disclosure replaces the backlight board 101 with the display screen 300. Accordingly, when detection and display apparatus is used for capturing fingerprints, the display screen 300 displays a pure color image or any other image. For example, the entire display screen 300 displays a single color (such as green or white), thus the display screen 300 plays the same role as the backlight board 101. When the information detection and display apparatus is used for displaying, the display screen 300 can be used for displaying. In other words, the display 300 can display information patterns (image information). Furthermore, light displayed by the display screen 300 can pass through the transparent substrate in the sensor and the transparent region of the pixel of the optical fingerprint imaging array, and then reach outside of the information detection and display apparatus, thus the function of displaying will be obtained. Accordingly, in comparison with conventional optical fingerprint imaging systems, the information detection and display apparatus provided by the present disclosure can play an additional role of displaying. Therefore, applications of the information detection and display apparatus provided by the present disclosure can be expanded.

According to one embodiment of the present disclosure, a detecting method of the information detection and display apparatus is provided. The detecting method is a fingerprint imaging method (a method for capturing a fingerprint image). And the detecting method can be applied to the information detection and display apparatuses which are provided by the above recited embodiments. The fingerprint imaging method includes four steps S1 to S4 as follows, as referring to FIG. 2.

S1, emitting a first beam of light by the display screen 300. Referring to FIG. 2, the first beam of light (not labeled in FIG. 2) is indicated by long arrows pointing up.

In some embodiments, the first beam of light includes at least one type of white light, purple light, blue light, cyan light, green light, yellow light or orange light.

S2, the first beam of light passing through the sensor 200 and the protective layer 400, and irradiate at fingerprints of the finger 500, referring to FIG. 2.

When the information detection and display apparatus is used for capturing a fingerprint image, the finger 500 is pressed on the upper surface of the protective layer 400. Thus, the first beam of light emitted from the display screen 300 can irradiate at fingerprints of the finger 500, wherein the first beam of light may include one color or a group of colors. The first beam of light emitted from the display screen 300 can pass through the sensor 200 (specifically, the transparent substrate 201 and the transparent region 230, referring to FIG. 3) and the protective layer 400, and then be reflected at an interface of the finger 500 and the protective layer 400 to generate a second beam of light.

S3, transmitting the second beam of light to the sensor 200. Referring to FIG. 2, the second beam of light (not labeled in FIG. 2) is indicated by short arrows pointing down.

The second beam of light can pass through the protective layer 400 and reach the sensor 200, thus the photosensitive devices 231 in the optical fingerprint imaging array can receive corresponding light respectively. Therefore, second beam of light can be received by the optical fingerprint imaging array in the sensor 200.

S4, the sensor receiving the second beam of light, and generating a fingerprint image of epidermal or dermal ridges of the finger based the second beam of light received, as shown in FIG. 2.

Thereafter, the photosensitive device 231 of the sensor 200 will implement a photon to electron conversion based on the received second beam of light being, so as to generate electronic signals. Thereafter, the electronic signals are transmitted to a corresponding processing circuit where the electronic signals are processed to generate the fingerprint image. Since the second beam of light is reflected by the interface between the finger 500 and the protective glass 400, it can be conceived that the information of the second beam of light can represent features of the interface. Further, the features of the interface depend on the features of the fingerprints. In light of the above, the image generated can directly present the features of the fingerprints.

The fingerprint imaging method (that is, the detecting method) can be applied to the detection and display apparatus provided by the present disclosure for capturing a fingerprint image. However, the detection and display apparatus also can be used for displaying image information like a conventional display apparatus, when it is not used for capturing fingerprint image. Further, the detection and display apparatus can be used for displaying predetermined information to remind the user to press his or her finger on the upper surface of the protective layer for capturing a fingerprint image. The fingerprint image captured can be displayed by the detection and display apparatus to inform the user. Accordingly, applications of the detection and display apparatus are expanded.

According to another embodiment of the present disclosure, a method for detecting an optical fingerprint image using the information detection and display apparatus is illustrated. The method is used for detecting fingerprint image of dermis of the finger and fingerprint image of veins of the finger. Referring to FIG. 2, the method includes nine steps from S1 to S9 as follows.

S1, referring to FIG. 2, emitting a first beam of light by the display screen 300 (not labeled in FIG. 2). The first beam of light is indicated by long arrows pointing up.

In some embodiments, the first beam of light includes at least one type of white light, purple light, blue light, cyan light, green light, yellow light or orange light.

S2, referring to FIG. 2, the first beam of light passing through the sensor 200 and the protective layer 400, and irradiating at fingerprints of the finger 500.

When the information detection and display apparatus is used for capturing a fingerprint image, the finger 500 is pressed on the protective layer 400. The display screen 300 displays the first beam of light which may include a single color or a group of colors will reach the fingerprints of the finger 500. The first beam of light emitted from the display screen 300 can pass through the sensor 200 (specifically, the transparent substrate 201 and the transparent region 230, referring to FIG. 3) and the protective layer 400, and then be reflected at an interface of the finger 500 and the protective layer 400 to form a second beam of light.

S3, transmitting the second beam of light reflected by the fingerprints to the sensor 200. The second beam of light is indicated by short arrows pointing down.

The second beam of light can pass through the protective layer 400 and reach the sensor 200, thus the photosensitive devices 231 (referring to FIG. 3) in the optical fingerprint imaging array can receive corresponding light respectively. Therefore, the second beam of light can be received by the optical fingerprint imaging array in the sensor 200.

S4, referring to FIG. 2, the sensor receiving the second beam of light, and generating a fingerprint image of epidermal or dermal ridges of the finger based on the second beam of light received.

Thereafter, the photosensitive device 231 of the sensor 200 will implement a photon to electron conversion based on the received second beam of light, so as to generate electronic signals. Thereafter, the electronic signals are transmitted to a corresponding processing circuit where the electronic signals are processed to generate the fingerprint image. Since the second beam of light is reflected by the interface between the finger 500 and the protective glass 400, it can be conceived that the information of the second beam of light 1012 can represent features of the interface. Further, the features of the interface depend on the features of the fingerprints. In light of the above, the image generated can directly represent the features of the pattern of the epidermal or dermal ridges.

So far, the fingerprint image of the epidermal or dermal ridges has been obtained.

S5, emitting a third beam of light (not shown in FIG. 2) by the display 300.

In some embodiments, the third beam of light may include at least one type of red light or near-infrared light.

S6, referring to FIG. 2, the third beam of light can penetrate through the sensor and the protective layer, and then irradiate at the finger. Further, the third beam of light can penetrate through the epidermal and dermal ridges of the finger, and be reflected by dermis and veins of the finger.

It should be noted that, since the third beam of light is red light or near-infrared light, most of the third beam of light can penetrate through the epidermal and dermal ridges of the finger. Thereafter, the third beam of light can be reflected by dermis and veins of the finger.

The finger 500 is pressed on the protective layer 400, when the information detection and display apparatus is used for capturing fingerprint image. Display screen 300 displays the third beam of light which includes at least one type of red light or near-infrared light, so that the third beam of light can irradiate at fingerprints of the finger 500. The third beam of light emitted from the display screen 300 can penetrate through the sensor 200 (specifically, the transparent substrate 201 and the transparent region 230, as shown in FIG. 3) and the protective layer 400. Most of the third beam of light can penetrate through the epidermal and dermal ridges of the finger 500. Thereafter, the third beam of light can be reflected by dermis and veins of the finger 500 to obtain a fourth beam of light.

S7, referring to FIG. 2, the fourth beam of light reaching the sensor 200.

Most of the fourth beam of light is generated by the third beam of light being reflected by the dermis and veins. A small part of the fourth beam of light is generated by the third beam of light being reflected by the epidermal and dermal ridges. This is because, even most of the third beam of light can penetrate through the epidermal and dermal ridges of the finger 500, part of the third beam of light is reflected or absorbed by the epidermal and dermal ridges of the finger 500. Thus, a small part of the fourth beam of light is generated by the third beam of light being reflected by the epidermal and dermal ridges of the finger 500, this small part of fourth beam of light is also received by the sensor 200. The fourth beam of light then can penetrate through the protective layer 400 and reach the sensor 200, thus the fourth beam of light can be received by the photosensitive device 231 of the sensor (referring to FIG. 3).

S8, referring to FIG. 2, the sensor 200 receiving and generating a preliminary image of the dermis and the veins of the finger based on the fourth beam of light.

Actually, the preliminary image is a mixed image of pattern of the epidermal and dermal ridges, and pattern of the dermis and veins. This is because, as illustrated above, the fourth beam of light includes two parts. Most of the fourth beam of light is generated by the third beam of light being reflected by the dermis and veins of the finger, while a small part of the second reflected light is generated by the third beam of light being reflected by the epidermal and dermal ridges of the finger.

S9, implementing a calculation based on the preliminary image and the fingerprint image of the epidermal or dermal ridges, for obtaining an ultimate image of the dermis and the veins.

Specifically, implementing a calculation may include implementing a subtraction to the preliminary image and the fingerprint image of the epidermal or dermal ridges, so as to deduct the fingerprint image of the epidermal or dermal ridges of the finger. Thus, image of the dermis and the veins of the finger can be obtained.

According to one embodiment of the present disclosure, a displaying method of the information detection and display apparatus is illustrated. The method can be applied to the information detection and display apparatus described above. The displaying method includes three steps S1 to S3 as follows, referring to FIG. 2.

S1, referring to FIG. 2, the display screen 300 displaying information image.

In some embodiments, the display screen 300 can display various kinds of information. For example, the display screen 300 can display an instruction to require a user to press his or her finger on the protective layer 400 for fingerprint detecting. Or, the display 300 can display profile of the user according to the fingerprint detected.

S2, referring to FIG. 2, the information image penetrating through the sensor 200.

Specifically, referring to FIG. 3, the information image can penetrate through the transparent region 230 of the sensor so as to penetrate through the sensor 200.

S3, referring to FIG. 2, the information image penetrating through the protective layer 400.

After penetrating through the protective layer 400, the information image can be seen by the user. Thus the information image can be observed by the user.

According to one embodiment of the present disclosure, a method for detecting an optical fingerprint image using the information detection and display apparatus as recited above is illustrated. Specifically, the detecting method is used for detecting finger-touch. The display method includes four steps S1 to S4 as follows, referring to FIG. 2.

S1, referring to FIG. 2, a first beam of light emitted from the display screen 300 reaching fingerprints of the finger 500.

In some embodiments, S1 can be performed according to corresponding processes of the previous embodiments. Accordingly, the firs beam of light may be visible light.

S2, referring to FIG. 2, a second beam of light which is generated by the first beam of light being reflected by the fingerprints of the finger, reaching the sensor 200.

In some embodiments, S2 can be performed according to corresponding processes of the previous embodiments. Accordingly, the second beam of light can reach the optical fingerprint imaging array.

S3, referring to FIG. 2, the sensor 200 receiving and generating fingerprint image based on the second beam of light.

In some embodiments, S3 can be performed according to corresponding processes of the previous embodiments. Accordingly, the fingerprint image may be a fingerprint image of the epidermal or dermal ridges. Besides, the fingerprint image may be a fingerprint image of the dermis and the veins of the finger.

S4, referring to FIG. 2, calculating a touching position of the finger according to the fingerprint image.

In some embodiments, fingerprint image of the epidermal and dermal ridges, or fingerprint image of the dermis and the veins of the finger can be obtained. At the same time, the touching position of the finger on a surface of the protective layer 400 is able to be determined according to a corresponding position of the fingerprint image on the entire sensor. Therefore, specific position of the finger 500 on the sensor can be calculated. Thus, the touching position of the finger can be obtained.

According to one embodiment of the present disclosure, an information displaying method of the information detection and display apparatus is illustrated. The method can be applied to the above described information detection and display apparatus. Referring to FIG. 2, the method includes four steps S1 to S4 as follows.

S1, referring to FIG. 2, the display screen 300 displaying an information image.

In some embodiments, the display screen 300 can display various kinds of information. For example, the display screen 300 may display an instruction to require a user to press his or her finger on the protective layer 400 for fingerprint detecting. Or, the display screen 300 may display profile of the user according to the fingerprint detected. Or, the display 300 may display an instruction to require the user to perform a corresponding touching operation.

S2, referring to FIG. 2, the sensor 200 capturing a fingerprint image.

In some embodiments, S2 can be performed according to corresponding processes of the previous embodiments. Specifically, capturing the fingerprint image can be implemented by the optical fingerprint imaging array in the sensor 200.

S3, referring to FIG. 2, detecting a touching position of the finger 500 based on the fingerprint image.

In some embodiments, above described detecting methods can be used for implementing detecting the touching position of the finger 500. Specifically, position of the finger on the sensor, that is the touching position, can be calculated based on corresponding position of the fingerprint image on the entire sensor.

S4, referring to FIG. 2, the display screen 300 displaying a new image according to the touching position of the finger.

In some embodiments, the display screen 300 displays corresponding new image according to the touching position of the finger. For example, the display screen 300 opens corresponding web links according to the touching position of the finger.

According to one embodiment of the present disclosure, another information detection and display apparatus is provided.

Figure 10:
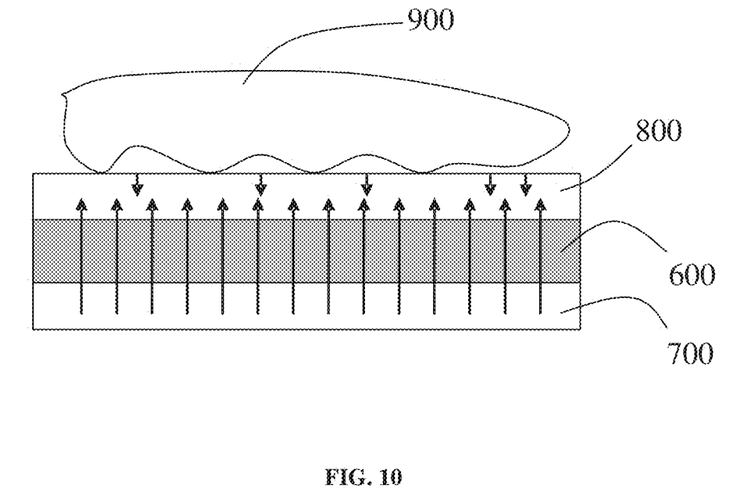
FIG. 10 schematically illustrates an information detection and display apparatus according to another embodiment of the present disclosure.

Referring to FIG. 10, an information detection and display apparatus according to one embodiment is illustrated. The information detection and display apparatus includes: an optical sensor 600, and a protective layer 800 which is disposed over the sensor 600. As shown in FIG. 10, a finger 900 is pressed on an upper surface of the protective layer 800. The information detection and display apparatus further includes a display screen 700 which is disposed underneath the sensor 600. The display screen 700 displays a pure color image or any other images, when the sensor is implementing fingerprint imaging, the pure color image or any other images displayed by the display 700 serves as a light source.

In some embodiments, the protective layer 800 is arranged for allowing a finger 900 being pressed on, thus fingerprints of the finger 900 can be captured by the sensor 600. The protective layer 800 may be made of fiber optic plate, glass, sapphire, or plastic.

Figure 11:
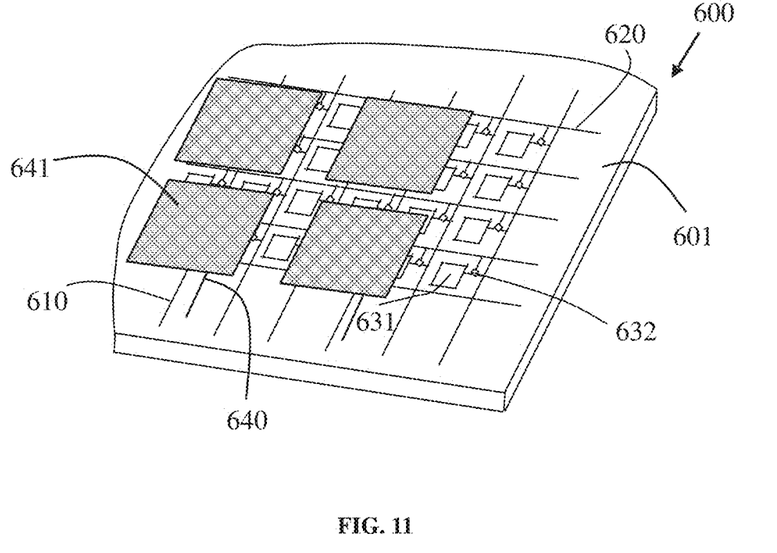
FIG. 11 schematically illustrates an optical sensor of the information detection and display apparatus as shown in FIG. 10.

Referring to FIG. 11, in order to detect a finger touching, the sensor 600 includes a transparent substrate, an optical fingerprint imaging array, and a finger-touch detecting array (not labeled) which is disposed on the optical fingerprint imaging array. The finger-touch detecting array includes a plurality of finger-touch detecting pixels (not labeled) arranged in an array.

Even not shown in FIG. 11, the finger-touch detecting array which is disposed on the optical fingerprint imaging array may have an insulating layer therebetween. The insulating layer may be made of transparent material.

Referring still to FIG. 11, specific structure of the sensor 600 is illustrated. In the information detection and display apparatus, the sensor 600 includes a transparent substrate 601, an optical fingerprint imaging array, and a finger-touch detecting array which is disposed on the optical fingerprint imaging array. The finger-touch detecting array includes a plurality of finger-touch detecting pixels, and each of the finger-touch detecting pixels has a transparent region (not labeled) and an opaque region (not labeled). Each of the plurality of finger-touch detecting pixels further includes an electrode pad 641.

In some embodiments, the optical fingerprint imaging array may be formed by an amorphous silicon (A-Si) process, an oxide semiconductor process, or a low temperature poly silicon (LTPS) process.

In some embodiments, the electrode pads 641 of the finger-touch detecting pixels (not labeled) may be made of transparent conductive material. The transparent conductive material may be made of indium tin oxide (ITO).

In some embodiments, the transparent substrate 601 may be made of glass, sapphire, plastic.

Referring still to FIG. 11, the optical fingerprint imaging array further includes signal lines 610 and drive lines 620. Usually, the signal lines 610 and the drive lines 620 are arranged along different axial directions. Thus, the signal lines 610 and the drive lines 620 can intercross with each other to form a number of regions where the plurality of optical fingerprint imaging pixels can be disposed.

Referring still to FIG. 11, each of the regions where the plurality of optical fingerprint imaging pixels disposed includes a signal control switch device 632 and a photosensitive device 631. Usually, both the signal control switch device 632 and the photosensitive device 631 are opaque. Accordingly, in the optical fingerprint imaging array, the signal lines 610, the drive lines 620, the signal control lines 632 and the photosensitive device 631 are opaque, other parts are transparent. In other words, in the region where one single optical fingerprint imaging pixel disposed, the signal control switch device 632 and the photosensitive device 631 are disposed on the corresponding opaque region, other parts are disposed on the corresponding transparent region. Therefore, the optical array sensor is partially transparent.

In some embodiments, in each of the optical fingerprint imaging pixels, a ratio of the area of the transparent region to the whole area of the optical fingerprint imaging pixel ranges from 5% to 50%. If the ratio is smaller than 5% of the total area of the optical fingerprint pixel, the displaying performance of the information detection and display apparatus may be dramatically degraded. Specifically, in this case, an area of the opaque region is too larger, thus image information displayed by the display screen can not penetrate through the sensor 600 smoothly and seen by the user. If the ratio is larger than 50%, an area of the photosensitive device 631 in the sensor 600 will shrink. Thus, the sensor 600 can not implement a well capturing to the fingerprint image.

The displaying performance of the display screen 700 in the information detection and display apparatus can be improved by raising a filling percentage of the transparent region with respect to the total area of the optical fingerprint imaging pixel. Specifically, the filling percentage of the transparent region with respect to the total area of the optical fingerprint imaging pixel can be set to 30%, 35%, 41%, 42%, 43%, 44%, 45%, 46%, 47%, 48%, 49% or 50%.

In some embodiments, the optical fingerprint imaging pixel may have a length less than or equal to 200 micrometers and a width less than or equal to 200 micrometers. The optical fingerprint imaging pixel can be designed to have a smaller size, so as to improve a sensing resolution of the optical fingerprint sensor.

Referring to FIG. 11, the finger-touch detecting array is disposed on the optical fingerprint imaging array, and the finger-touch detecting pixels are larger than equal to the corresponding optical fingerprint imaging pixels, respectively. The electrode pads 641 are connected to a periphery of the sensor through signal lines 640, and then to a signal-read chip. When the finger 900 touches the protective layer 800 of the information detection and display apparatus, skin of the finger 900 and the electrode pads 641 of the finger-touch detecting pixels constitute a coupling capacitor. When reading out signals, signals from finger-touch detecting pixels where the finger 900 touched is significantly different from signals from other non-touched detecting pixels, thus finger-touch position can be calculated based on the differences between signals.

Furthermore, the finger-touch position is also able to be calculated based on fingerprints captured by the optical fingerprint imaging array.

In some embodiments, the display screen 700 may be a liquid crystal display (LCD) screen, an organic light emitting diodes (OLED) display screen, or an inorganic light emitting diodes display screen. The corresponding alignment between display pixels in the display screen 700 and the optical fingerprint detecting pixels in the sensor 600 can refer to illustration about FIG. 7 to FIG. 9.

According to one embodiment of the present disclosure, another detecting method which can be applied to the information detection and display apparatus is illustrated. Referring to FIG. 10, the method includes three steps S1 to S3 as follows.

S1, referring to FIG. 10, forming a coupling capacitor by the finger-touch detecting pixels and the finger 900 attached on the protective layer 800.

Specifically, the finger 900 is pressed on an upper surface of the protective layer 800, thus the finger 900 and the electrode pads 641 on the optical fingerprint imaging pixels constitute the coupling capacitor. As such, touching signals can be generated.

S2, referring to FIG. 10, reading signals from the finger-touch detecting pixels.

In some embodiments, reading the touching signals may be implemented by an amplifying circuit.

S3, referring to FIG. 10, calculating a touching position of the finger 900 according to the signals from the finger-touch detecting pixels.

According to one embodiment of the present disclosure, another displaying method which can be applied to the information detection and display apparatus as shown in FIG. 10 is illustrated. Referring to FIG. 10, the method includes three steps S1 to S3 as follows.

S1, referring to FIG. 10, the display screen 700 displaying an information image.

In some embodiments, the display screen 700 can display various kinds of information. For example, the display screen 700 can display an instruction to require a user to press his or her finger on the protective layer for fingerprint detecting. Or, the display screen 700 can display profile of the user based on fingerprints detected. Or, the display screen 700 can display an instruction to require the user to perform corresponding touching operations.

S2, referring to FIG. 10, the finger-touch detecting array detecting a touching position of the finger 900.

In some embodiments, finger-touch detecting pixels in the finger-touch detecting array are coupled to the finger 900, thus touching signals can be generated. Through reading out touching signals by a corresponding read circuit, the touching position can be obtained.

S3, referring to FIG. 10, the display screen 700 displaying a new image based on the touching position of the finger 900.

Specifically, the display screen 700 can refresh according to the touching position of the finger 900 to display a new image. For example, if the touching position is a web link, then the corresponding web page will be opened and displayed on the display screen 700.

The fingerprint imaging method (the detecting method) provided by embodiments of the present disclosure can be applied to the information detection and display apparatus during the fingerprint image capturing thereof. However, during other period of operation, the information detection and display apparatus can be used as a conventional display apparatus for displaying all kinds of image information.

Although the present disclosure has been disclosed above with reference to preferred embodiments thereof, it should be understood by those skilled in the art that various changes may be made without departing from the spirit or scope of the disclosure. Accordingly, the present disclosure is not limited to the embodiments disclosed.

What is claimed is:

1. An information detection and display apparatus, comprising:
   an optical sensor;
   a protective layer disposed above the sensor; and
   a display screen disposed underneath the sensor, wherein the display screen serves as a light source when the optical sensor is used for detecting optical information of an object placed on the protective layer,
   whereby a first beam of light emitted by the display screen successively penetrates through the optical sensor and the protective layer to irradiate an interface between the protective layer and the object placed on the protective layer, and wherein part of the first beam of light is reflected by the interface and thereby becomes a second beam of light, and the second beam of light is transmitted back to the optical sensor.

2. The apparatus according to claim 1, wherein the optical sensor is used for detecting the second beam of light.

3. The apparatus according to claim 2, wherein the optical sensor comprises a transparent substrate, and an optical fingerprint imaging array disposed on the transparent substrate, where the optical fingerprint imaging array is used for detecting the second beam of light.

4. The apparatus according to claim 3, wherein the protective layer comprises fiber optic plate, glass, sapphire or plastic.

5. The apparatus according to claim 3, wherein the optical fingerprint imaging array comprises a plurality of optical fingerprint imaging pixels arranged in an array, and each of the optical fingerprint imaging pixels has a transparent region and an opaque region.

6. The apparatus according to claim 5, wherein the optical fingerprint imaging array is formed by an amorphous silicon process, an oxide semiconductor process, or a low temperature poly-silicon process.

7. The apparatus according to claim 5, wherein in each of the optical fingerprint imaging pixels, a ratio of an area of the transparent region to that of the optical fingerprint imaging pixel ranges from 5% to 50%.

8. The apparatus according to claim 5, wherein each of the optical fingerprint imaging pixels has a length less than or equal to 200 micrometers, and a width less than or equal to 200 micrometers.

9. The apparatus according to claim 5, wherein display pixels of the display screen are grouped into a plurality of display units each of which has a length not less than that of the optical fingerprint imaging pixel, and a width not less than that of the optical fingerprint imaging pixel.

10. The apparatus according to claim 9, wherein each of the display units includes a plurality of display pixels, where the plurality of display pixels in a same display unit display a same color.

11. The apparatus according to claim 1, further comprising a plurality of finger-touch detecting pixels arranged in an array to detect a finger touching on the protective layer.

12. The apparatus according to claim 11, wherein the finger-touch detecting pixels are larger than or equal to the optical fingerprint imaging pixels.

13. The apparatus according to claim 12, wherein each of the finger-touch detecting pixels comprises an electrode pad used to constitute a capacitor together with the finger touching on the protective layer.

14. The apparatus according to claim 13, wherein the electrode pads are made of a transparent conductive material.

15. A method for detecting fingerprint using the information detection and display apparatus of claim 1, comprising:
    emitting, by a display screen, a first beam of light;
    receiving, by an optical sensor, a second beam of light, wherein the second beam of light is generated by: the first beam of light penetrating through the optical sensor and the protective layer to irradiate an interface between the protective layer and a finger placed on the protective layer, wherein part of the first beam of light is reflected by epidermal or dermal ridges of the finger and thereby becoming the second beam of light, and the second beam of light is transmitted to the optical sensor; and
    generating a first image based on the second beam of light.

16. The method according to claim 15, wherein the first beam of light comprises at least one type of white light, purple light, blue light, cyan light, green light, yellow light or orange light.

17. The method according to claim 15, further comprising:
    emitting, by the display, a third beam of light;
    receiving, by the optical sensor, a fourth beam of light, where the fourth beam of light is generated by: the third beam of light penetrating through the optical sensor and the protective layer to irradiate at the finger placed on the protective layer, part of the third beam of light being reflected by dermis or veins of the finger and thereby becoming the fourth beam of light, and the fourth beam of light transmitting to the optical sensor; and
    generating a second image based on the fourth beam of light.

18. The method according to claim 17, wherein the third beam of light comprises at least one type of red light or near-infrared light.

19. The method according to claim 17, further comprising: processing the second image based on the first image, so as to generate a third image.

20. The method according to claim 19, wherein processing the second image based on the first image comprises implementing image subtraction between the first image and the second image.

21. A method for detecting finger position using the information detection and display apparatus of claim 1, comprising:
    emitting, by the display screen, a first beam of light;
    receiving, by the optical sensor, a second beam of light, wherein the second beam of light is generated by: the first beam of light penetrating through the optical sensor and the protective layer to irradiate an interface between the protective layer and a finger placed on the protective layer, wherein part of the first beam of light is reflected by the interface and thereby becoming the second beam of light, and the second beam of light is transmitted to the optical sensor;

generating a fingerprint image of the finger based on the second beam of light; and calculating a finger touching position based on a position of the fingerprint image.

* * * * *